July 8, 1947.                L. KARL ET AL                2,423,812
             THERMOSTATIC OUTLET VALVE CONTROL FOR FLUID COUPLING
                    Filed July 3, 1940            2 Sheets-Sheet 1
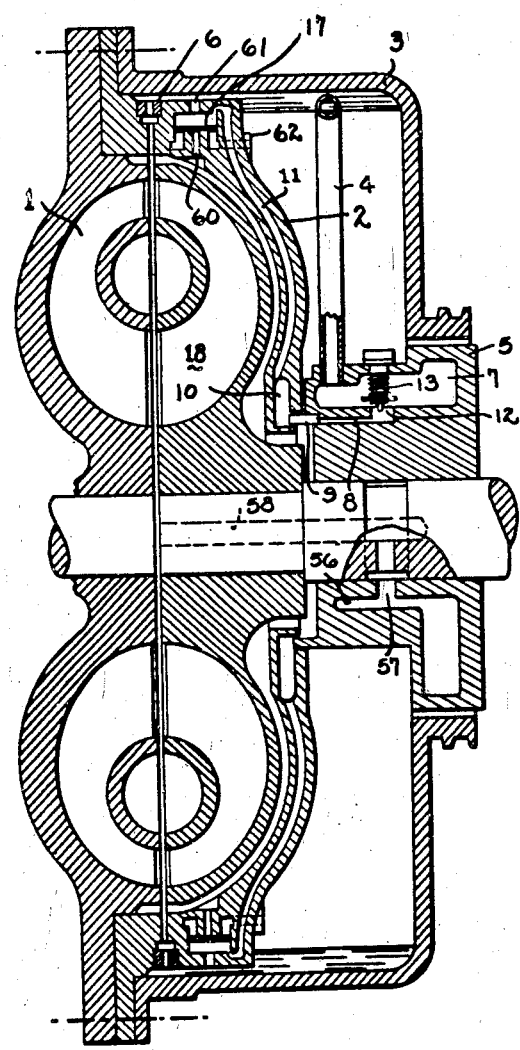
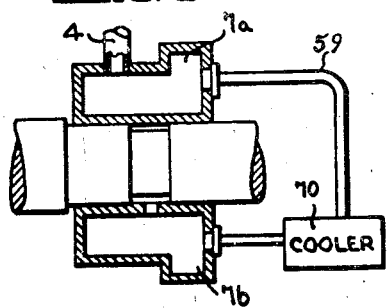
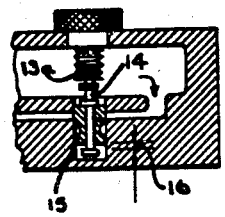
INVENTORS
LORENZ KARL
FRITZ KUGEL
BY Toulmin & Toulmin
ATTORNEYS

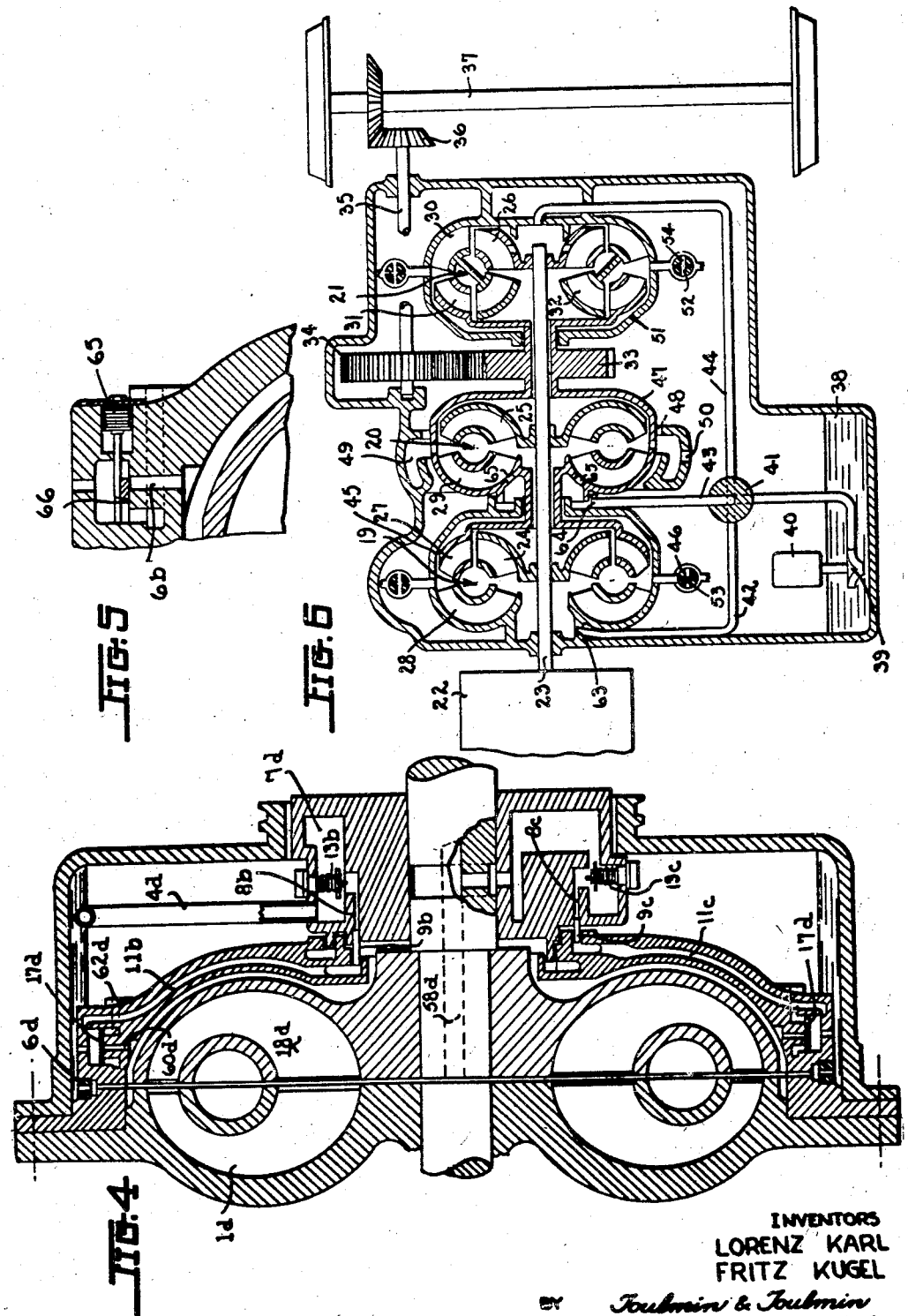

Patented July 8, 1947

2,423,812

UNITED STATES PATENT OFFICE 2,423,812

THERMOSTATIC OUTLET VALVE CONTROL FOR FLUID COUPLING

Lorenz Karl and Fritz Kugel, Heidenheim-on-the-Brenz, Germany, assignors to American Voith Contact Company, Inc., New York, N. Y., a corporation of New York Application July 3, 1940, Serial No. 343,882
In Germany April 29, 1939

2 Claims. (Cl. 60—54)

This invention relates to control systems for hydraulic circuits, and in particular to control systems in connection with hydraulic devices such as torque converters and couplings for controlling the discharge of fluid from such devices to means for cooling the said fluid.

To withdraw the heat generated in hydraulic drives and couplings, usually a portion of the driving fluid is circulated and, if required, passes through a cooling system for cooling the fluid. The fluid is discharged from the hydraulic circuit to the cooling system through openings or bores which, as a rule, are continuously kept open. However, only a definite quantity of liquid can pass through the said continuously open bores, which quantity only at a certain state of operation, i. e., at a certain degree of filling, corresponds to the heat developed in the driving fluid. At all other times or conditions of operation the quantity of discharged liquid is either too large or too small. In other words, the discharge openings can be designed only for a state of operation with a medium temperature of the driving liquid. A decrease in the discharge section of the discharge opening or openings would cause a too great development of heat in the liquid when the load increases. On the other hand, an increase in the section of the discharge opening or openings would result in a discharge of too much liquid to be cooled if the load decreases so that with hydraulic couplings for instance, the slip could not be kept sufficiently small.

A varying load in a hydraulic circuit prevails for instance, when the hydraulic circuit is used for propelling a vehicle within a predetermined range of speed as well as for braking and also as drive converter or brake converter.

Accordingly, it is an object of the invention to provide a thermostatic outlet valve control for hydraulic devices, such as torque converters and couplings, in which the discharge of fluid from said devices to a cooling system is automatically varied, in accordance with the state of operation of said devices.

Another object of the invention consists in the provision of a control system for the hydraulic circuits of rotary devices, such as torque converters and couplings, wherein a stationary annular distributing casing and an associated temperature responsive element are arranged within an outer rotary casing of the device and about the axis of rotation of the latter for the purpose of distributing the working fluid through one or more circuits of the device according to the temperature of the fluid.

It is a further object of the invention to provide a control system of the above mentioned type, in which the discharge of driving fluid to be circulated through a cooling system is varied in accordance with the temperature of the driving fluid.

These and other objects and advantages of the invention will appear more clearly from the following specification in connection with the accompanying drawings, in which:

Figure 1 illustrates a hydraulic coupling according to the present invention;

Figure 2 shows a portion of a circulating circuit, including cooling means for cooling the driving fluid;

Figure 3 shows, on a somewhat larger scale, a detail of the thermostatic control system;

Figure 4 illustrates a second embodiment, in which a plurality of thermostatic valves is actuated successively at different temperatures;

Figure 5 shows a further embodiment illustrating a device responsive to the driving fluid temperature for gradually varying the discharge opening for the driving fluid;

Figure 6 is a diagrammatic view of a gear system embodying structures made according to the invention.

The drawbacks referred to above are overcome, according to the present invention, by varying the quantity of fluid discharged from the hydraulic circuit and circulating said quantity through a cooling system in accordance with the condition of operation of the said hydraulic circuit. This is effected by varying the discharge openings during the operation. This control may be carried out automatically. According to a very simple method, the control is effected thermostatically, that is directly in accordance with the temperature of the discharged fluid. The thermostat may be arranged at a proper place and be directly or indirectly connected with the discharge valves, the discharge opening of which is to be controlled.

Referring more specifically to the drawings, the numeral 1 indicates a pump wheel which has connected therewith an inner casing 2 and an outer casing 3. Arranged in the space between the two casings is a conveying pipe 4 mounted in the stationary casing 5. The conveying pipe or scoop tube 4 receives the fluid discharged from the interior of the circuit through the continuously open nozzle 6 and forming a ring in the outer casing 3. The said fluid is circulated by passing through the conveying pipe 4 and chamber 7 of the stationary distributing casing 5 into passageway 56 from where it flows through the bores 57 and 58 back into the pump wheel 1 and secondary rotor 18, as shown in Figure 1. If desired, the chamber 7 may be subdivided into two separate chambers 7a and 7b (see Figure 2) which are interconnected by a conduit 59 including any desired cooling means 70, for instance, merely a container or a pipe system. The chamber 7 of the distributing casing is adapted to communicate with the conduit 9 by means of a passageway 8. The pipe 9 discharges the controlling fluid into the annular channel 10 connected with the controlling passageways 11 of the controlled discharge valves 17. The chamber 7 furthermore encloses a bellows 13 which is adapted to expand when the temperature increases. The bellows 13 which is arranged opposite the inlet 12 of the passageway 8 is surrounded by the fluid conveyed through the conveying pipe 4 and always has the same temperature as the said fluid. The free end of the thermostat constitutes a valve body and forms a closing member for controlling the communication between the chamber 7 and the inlet of the passageway 8. As long as the temperature of the driving fluid is below a predetermined value, the thermostat valve remains open so that the fluid escaping through the continuously open nozzle 6 is circulated as described above. At this time a portion of the fluid in chamber 7 passes, due to centrifugal force, through passageway 11, and since this fluid acts upon a larger surface of valve disc 17 than does the fluid conveyed from the rotors 1 and 18 through passageway 60 to valve disc 17, the valve disc 17 remains in its closing position. It will be noted that a small quantity of fluid escapes through the continuously open nozzle 61 but this quantity is immediately made up by fluid conveyed through passageway 11. However, when the temperature of the driving fluid exceeds a predetermined value, the thermostat valve closes off the supply of fluid to the controlling conduits 11 so that the fluid escaping through nozzle 61 cannot be made up, which results in an immediate opening of the additional discharge valves 17 providing discharge of fluid from the couplings through passages 60 and 62. In this manner a larger quantity of fluid may escape from the rotors 1 and 18 through passageways 60 and 62 and may be circulated through the conveying pipe 4, the chamber 7, bores 57 and 58, back to the rotors 1 and 18. When the temperature decreases again, the supply of fluid into the controlling conduits of the additional valves is increased so that the latter are closed again and, if hydraulic couplings are involved, the minimum slip is restored.

In order to avoid a swinging back and forth, provision may be made for opening and closing the additional discharge valves at temperatures which differ from each other by about 20° to 30° centigrade. The desired temperature limit at which the additional valves are to become operative may be determined by adjusting the thermostat valve accordingly.

If it is desired at a further increase in the temperature in spite of the increased circulation of fluid through the circuit, to open further discharge valves, the controlling conduits of the discharge valves may be controlled by further thermostats which are adjusted so that they become operative only at a higher temperature.

It is understood the embodiment diagrammatically illustrated in Figure 1 is merely an example and does by no means limit the invention to the structure disclosed therein. For instance, the thermostat may be replaced by any standard temperature responsive device.

Since with the additional discharge control described above the slip suddenly increases by a predetermined amount whenever the additional valves are opened while a closing of said valves causes a reduction of the slip, it may be advantageous to vary the discharge section of the usual discharge nozzles gradually in accordance with the conditions of operation rather than to provide additional discharge valves.

Figure 3 illustrates an embodiment adapted to prevent swinging back and forth of the controlling device illustrated in Figure 1. The valve of Figure 3 comprising the bellows 13a corresponds substantially to that of Figure 1. However, the thermostat associated with the bellows 13a has connected thereto a valve rod 14 having slidably mounted thereon a valve member 15.

As will be seen from Figure 3, a dead stroke 16 is provided between the valve rod 14 connected with the thermostat and the valve member 15 constituting a slide. Consequently, when, for instance, at a fluid temperature of 80° centigrade, the thermostat has moved the valve into its closing position, i. e., in the present instance downwardly, the additional discharge valves remain open until the temperature of the driving fluid has decreased to 60° centigrade, at which temperature the bellows has contracted by more than the distance of the dead stroke 16.

Referring to Figure 4, the embodiment shown therein is similar to that of Figure 1 with the exception that two separate channels 8b, 9b, 11b; 8c, 9c, 11c are provided, of which the channel 8b, 9b, 11b is controlled by a thermostatic valve 13b, whereas the channel 8c, 9c, 11c is controlled by a thermostatic valve 13c. Otherwise, the arrangement corresponds to that of Figure 1 and the corresponding parts are, therefore, designated with the same reference numerals, however, with the additional letter d. The arrangement is such that one of the thermostatic valves, for instance, the thermostatic valve 13b closes the channel controlled thereby and, in this way, causes opening of the outlet port 60d at a temperature lower than the temperature at which the valve 13c will close the channel controlled thereby.

In the structure shown in Figure 5, the channel 11 and ports 60 of Figure 1 have been omitted, while a thermostatic valve 65 directly controls the discharge bore 6b by means of a slide valve 66. The arrangement is such that the slide valve normally allows a predetermined quantity of fluid to escape from the chamber confined by the rotors 1 and 18, and gradually increases the effective discharge opening when the thermostatic valve expands in correspondence to the increase in temperature of the driving fluid.

The gear illustrated in Figure 6 comprises a torque converter 19 for low forward speed, a torque coupling 20 for high forward speed and a torque converter 21 for rearward drive. The motor 22 drives, by means of the shaft 23, the pump wheels 24, 25, 26 of the different circuits. In the forward converter 19 the liquid flows from the pump wheel 24 through the turbine 27 into the guide wheel 28 and from there back to the pump wheel 24. In the coupling 20 the liquid in the pump wheel 25 flows toward the outside and in the turbine wheel 29 the liquid flows toward the inside. In the rearward converter 21 the liquid flows from the pumping wheel 26 into the reversing guide wheel 30 and passes from there through the turbine wheel 31 and then into the guide wheel 32. The drive of the turbine wheels 27, 29, 31 is transmitted by means of the gears 33, 34, the shaft 35, the beveled gears 36 and the drive shaft 37.

When the vehicle is at a standstill, the driving fluid is in the storage container 38 from where it is conveyed to the distributing valve 41 by means of the pump 39 operable by the electromotor 40. In accordance with the desired controlling operation, the driving liquid is passed from the distributing valve 41 into the conduits 42, 43 or 44 of the respective hydraulic circuit. The converter 19 comprises a stationary casing including the guide wheel 28 and the casing 45, which latter communicates through port 63 with conduit 42. The converter 19 is provided with a controllable discharge member 46 which, in the position shown in the drawings, has a small discharge opening. The coupling 20 has a rotatable casing comprising the turbine wheel 29 and the casing 47, and receives fluid from the conduit 43 through ports 64 and 65. The coupling 20 is provided at the circumference thereof with discharge openings 48 which correspond to the discharge openings 60 of Figure 1 and, like the latter, are supposed to cooperate with valve discs controlled in the same manner as the discs 17 of Figure 1. However, since this controlling system has been fully disclosed in connection with Figure 1, it has been omitted in Figure 3, in order not to overload the said Figure 3. The fluid discharged through the openings 48 is collected in the conveying channel 49. The channel 49 has at the lowest point thereof an opening 50 through which the fluid may return into the storage container 38. The converter 21 is likewise provided with a stationary casing comprising the guide wheel 30 and the casing 51 which receives its fluid from the conduit 44. The discharge from the converter is controllable by means of the valve 52 having bores of different sections.

At normal operation of the converter 19, the discharge member 46 has only a small discharge opening, as shown in the drawing. However, when at higher forward driving speeds at which the torque imparted upon the torque converter is negative, this converter is used for braking the forward speed by means of small braking forces or is used for braking the rearward speed, the discharge member 46 is adjusted so that it has a larger discharge section 53. This adjustment of the discharge member may be effected in any desired manner. In this connection, it should be noted that the secondary torque of a converter of a predetermined maximum value in starting condition $$\left(\frac{n_2}{n_1}=0.\right)$$

gradually decreases when the secondary speed increases, i. e., when the driving speed of the vehicle increases. The secondary torque eventually reaches the value zero at a predetermined speed and becomes negative when the speed increases beyond said last mentioned predetermined speed. Normally, such a converter is used only up to a speed at which its secondary torque equals about the primary torque. If, however, such a circuit is put into operation at such a high speed, i. e., is filled, at which speed its torque is negative, then it will be clear that the said converter will cause a braking effect, in other words, will use up energy from the vehicle and not from the motor. Consequently, a converter designed for low speeds, in particular for starting, may be used for braking at high speeds. The braking forces occurring at such braking action increase with increasing speed.

However, as long as the speed is not much higher than the speed at which the graph indicating the torque passes through zero, the braking forces are not particularly great.

The discharge member 52 of the converter 21 is shown in the drawings in a position in which this converter is operated for moving the vehicle rearwardly. However, if this converter is operated while the vehicle is moving forwardly, i. e., when the converter is used for braking the forward speed by means of great braking forces, the valve member 52 is to be adjusted so as to have a great discharge section 54.

It will be understood that we desire to comprehend within our invention such modifications as come within the scope of the claims.

Having thus fully described our invention, what we claim as new and desire to secure by Letters Patent is:

1. In a hydraulic power transmitting device, a driving rotor and an axially alined driven rotor defining a working chamber adapted to be supplied with driving fluid for driving said driven rotor, a stationary annular chamber extending circumferentially about the axes of rotation of said rotors, an annular housing carried by one of said rotors and encasing both the other rotor and at least a portion of said stationary annular chamber, a conveying pipe having one end thereof communicating with the interior of said stationary chamber and the other end extending circumferentially along the interior surface of said annular housing, conduit means cooperating with said pipe and stationary chamber for forming a hydraulic circuit with said rotors, said last-named means including main outlet means allowing a constant flow of fluid to flow from the rotors into the annular housing, through the conveying pipe and into the stationary chamber, centrifugally operable outlet means associated with said working chamber for varying the flow of driving fluid from said working chamber to the interior of said annular housing, means disposed within said annular housing and rotatable with the latter for maintaining the outlet means in closed position during normal operation of the coupling, said maintaining means comprising a disk member having a passageway therein extending inwardly from the centrifugally operable outlet means to a point adjacent the stationary chamber, second conduit means for supplying working fluid from said stationary chamber to said passageway and associated outlet means, means permitting restricted and continuous escape of the fluid supplied said centrifugally operated outlet means into said annular housing, temperature responsive means mounted within said stationary chamber and responsive to a predetermined high temperature range of the liquid therein for preventing the flow of fluid through said supplying means to thereby permit centrifugal force to actuate said centrifugally operated outlet means and allow fluid to flow from said working chamber.

2. A hydraulic power transmitting device according to claim 1 wherein said temperature responsive means comprises a valve in said second conduit, a bellows mounted within said stationary chamber, and a linkage connecting said bellows and said valve, said linkage being operable by said bellows to perform a lost motion stroke prior to actuating said valve.

LORENZ KARL.
FRITZ KUGEL.

REFERENCES CITED

The following references are of record in the file of this patent:

UNITED STATES PATENTS

| Number | Name | Date |
|---|---|---|
| 2,166,940 | Conradson | July 25, 1939 |
| 1,780,613 | Bauer et al. | Nov. 4, 1930 |
| 1,979,930 | Bauer et al. | Nov. 6, 1934 |
| 2,141,305 | Kösters | Dec. 27, 1938 |
| 2,144,596 | Daiber | Jan. 17, 1939 |
| 2,155,740 | Seibold | Apr. 25, 1939 |
| 2,186,956 | Canaan | Jan. 16, 1940 |
| 1,910,697 | Kiep | May 23, 1933 |
| 2,210,922 | Joesting | Aug. 13, 1940 |
| 2,110,741 | Seibold | Mar. 8, 1938 |
| 2,187,667 | Sinclair | Jan. 16, 1940 |
| 2,405,135 | Butzbach | Aug. 6, 1946 |

FOREIGN PATENTS

| Number | Country | Date |
|---|---|---|
| 375,750 | Italy | Oct. 23, 1939 |